US011834562B2

(12) United States Patent
Shiao et al.

(10) Patent No.: US 11,834,562 B2
(45) Date of Patent: Dec. 5, 2023

(54) POLYMER REINFORCED GLASS MAT WITH ENHANCED NAIL SHANK SHEAR RESISTANCE, SHINGLES INCLUDING THE SAME, AND METHODS OF MANUFACTURING THE SAME

(71) Applicant: BMIC LLC, Dallas, TX (US)

(72) Inventors: Ming-Liang Shiao, Basking Ridge, NJ (US); Jim Svec, Kearny, NJ (US); Brian Lee, Linden, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/706,009

(22) Filed: Mar. 28, 2022

(65) Prior Publication Data

US 2023/0015974 A1 Jan. 19, 2023

Related U.S. Application Data

(63) Continuation of application No. 17/333,955, filed on May 28, 2021, now Pat. No. 11,286,360.

(60) Provisional application No. 63/031,680, filed on May 29, 2020.

(51) Int. Cl.
| | |
|---|---|
| *C08J 5/24* | (2006.01) |
| *C08J 7/04* | (2020.01) |
| *C08J 5/04* | (2006.01) |
| *C08J 5/08* | (2006.01) |
| *C09D 195/00* | (2006.01) |
| *E04D 1/20* | (2006.01) |
| E04D 1/00 | (2006.01) |
| C08K 3/26 | (2006.01) |

(52) U.S. Cl.
CPC .............. *C08J 5/248* (2021.05); *C08J 5/043* (2013.01); *C08J 5/08* (2013.01); *C08J 7/0423* (2020.01); *C09D 195/00* (2013.01); *E04D 1/20* (2013.01); *C08J 2323/02* (2013.01); *C08J 2395/00* (2013.01); *C08K 3/26* (2013.01); *C08K 2003/265* (2013.01); *E04D 2001/005* (2013.01)

(58) Field of Classification Search
CPC . C08J 5/248; C08J 7/0423; C08J 5/043; C08J 5/08; C09D 195/00; E04D 1/20; E04D 2001/005
USPC ......................................................... 428/429
See application file for complete search history.

(56) References Cited

U.S. PATENT DOCUMENTS

| | | | |
|---|---|---|---|
| 4,871,605 A * | 10/1989 | Pagen ....................... | E04D 5/02 428/141 |
| 5,744,229 A | 4/1998 | Gleason et al. | |
| 5,932,665 A | 8/1999 | Deporter et al. | |
| 6,114,464 A | 9/2000 | Reck et al. | |
| 6,136,916 A | 10/2000 | Arkens et al. | |
| 6,299,936 B1 | 10/2001 | Reck et al. | |
| 6,348,530 B1 | 2/2002 | Reck et al. | |
| 6,737,369 B2 | 5/2004 | Peng et al. | |
| 10,982,446 B2 | 4/2021 | Swayne et al. | |
| 2002/0061379 A1 * | 5/2002 | Zickell ...................... | E04D 5/02 428/40.1 |
| 2005/0208861 A1 | 9/2005 | Dwiggins et al. | |
| 2008/0014813 A1 | 1/2008 | Xing et al. | |
| 2011/0139366 A1 | 6/2011 | Belt et al. | |

FOREIGN PATENT DOCUMENTS

EP 1655400 A1 5/2006

* cited by examiner

*Primary Examiner* — Hui H Chin
(74) *Attorney, Agent, or Firm* — GREENBERG TRAURIG, LLP

(57) ABSTRACT

Some embodiments of the present disclosure relate to an article comprising a reinforced glass mat. In some embodiments, the reinforced glass mat includes a glass mat and a reinforcement material. In some embodiments, the glass mat includes a web of glass fibers. In some embodiments, the reinforcement material is embedded into the web of glass fibers of the glass mat. In some embodiments, the reinforced glass mat includes a sufficient amount of the reinforcement material, so as to result in a nail shank shear resistance of 13 lbs to 17 lbs, when the article is tested according to ASTM 1761 at 140° F. Methods of making the article, specific embodiments of the reinforcement material in the form of a polymeric binder, and methods of forming a roofing shingle from the article are also disclosed.

19 Claims, 2 Drawing Sheets

Figure 1:
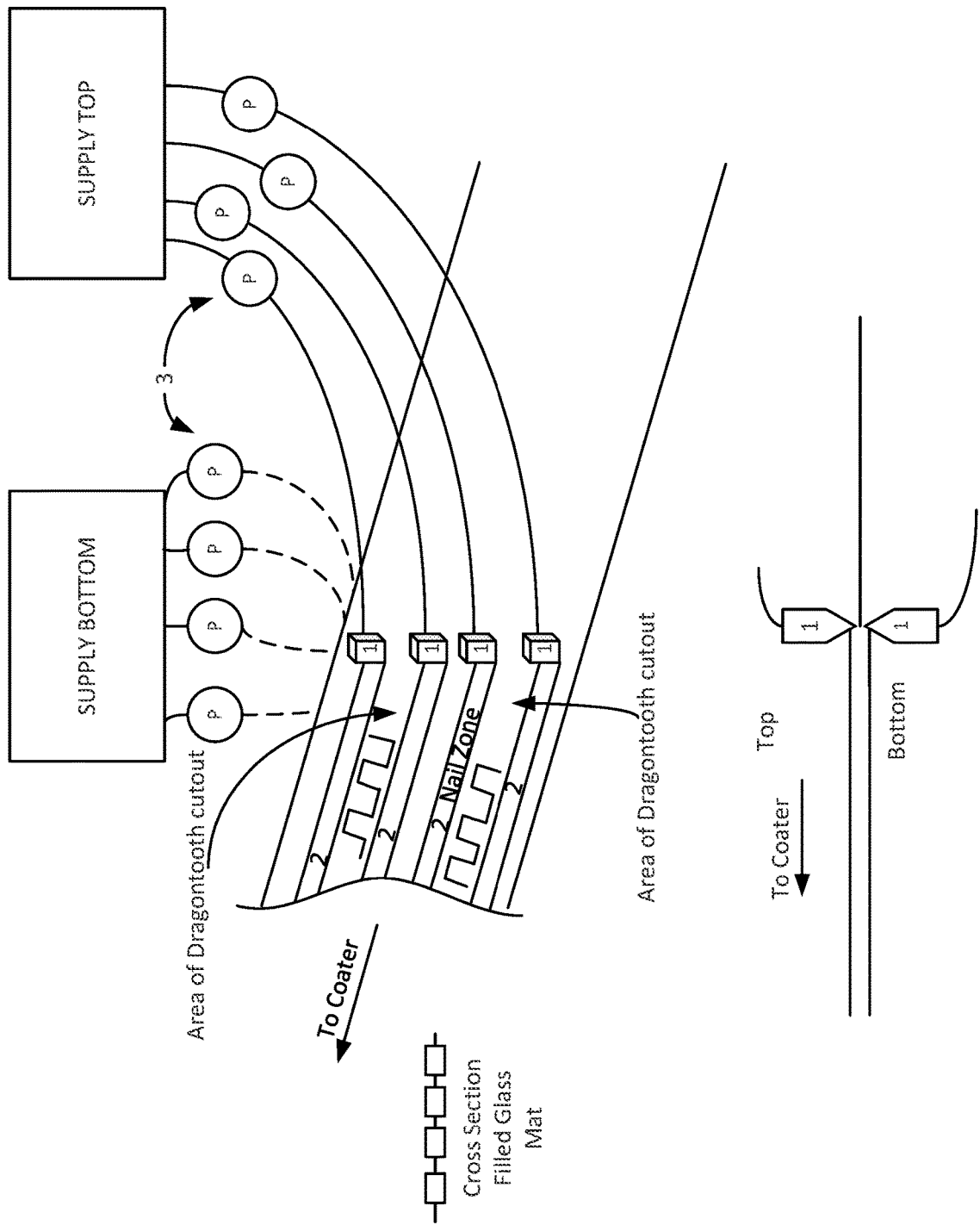

POLYMER REINFORCED GLASS MAT WITH ENHANCED NAIL SHANK SHEAR RESISTANCE, SHINGLES INCLUDING THE SAME, AND METHODS OF MANUFACTURING THE SAME

CROSS-REFERENCE TO RELATED APPLICATIONS

This application is a continuation of U.S. patent application Ser. No. 17/333,955, entitled "POLYMER REINFORCED GLASS MAT WITH ENHANCED NAIL SHANK SHEAR RESISTANCE, SHINGLES INCLUDING THE SAME, AND METHODS OF MANUFACTURING THE SAME," filed May 28, 2021, which claims the benefit of U.S. Provisional Application No. 63/031,680, entitled "POLYMER REINFORCED GLASS MAT WITH ENHANCED NAIL SHANK SHEAR RESISTANCE, SHINGLES INCLUDING THE SAME, AND METHODS OF MANUFACTURING THE SAME," filed on May 29, 2020, the entirety of which are hereby incorporated by reference.

FIELD

The present disclosure relates to a reinforced glass mat with enhanced nail shank shear resistance. In some embodiments, the reinforced glass mat may be included in an article, such as but not limited to, a roofing shingle.

BACKGROUND

One potential risk for nailing articles that include a glass mat, such as but not limited to roofing shingles, is the potential fabric tearing by nail shanks (e.g., by heavy foot traffic in a steep slope, especially during a very hot day). Improvements to the resistance to damages induced by fasteners such as nails are therefore highly desirable and necessary.

SUMMARY

Some embodiments of the present disclosure relate to an article comprising a polymer reinforced glass mat. In some embodiments, the reinforced glass mat includes a glass mat and a reinforcement material in the form of a polymeric binder. In some embodiments, the glass mat includes a web of glass fibers. In some embodiments, the polymeric binder is embedded into the web of glass fibers of the glass mat. In some embodiments, the reinforced glass mat includes a sufficient amount of the polymeric binder, so as to result in a nail shank shear resistance of 13 lbs to 17 lbs, when the article is tested according to ASTM 1761 at 140° F.

In some embodiments, the polymeric binder includes at least one polymer having a melting temperature of 120° C. to 200° C.

In some embodiments, the polymeric binder includes at least one polymer having a melt flow index of 20 to 60 measured according to ASTM D1238.

In some embodiments, the polymeric binder includes at least one polymer having a vicat softening temperature of 50° C. to 90° C. measured according to ASTM D1525.

In some embodiments, the polymeric binder includes low-density polyethylene (LDPE), medium-density polyethylene (MDPE), high-density polyethylene (HDPE), polypropylene, at least one acrylic, polyvinyl siloxane (PVS), poly(styrene-butadiene-styrene) (SBS), atactic polypropylene (APP), or any combination thereof.

In some embodiments, the sufficient amount of the polymeric binder ranges from 0.1 wt % to 1.2 wt % based on a total weight of the article.

In some embodiments, an asphalt coating is included, and, in some embodiments, the asphalt coating surrounds the polymer reinforced glass mat.

In some embodiments, the asphalt coating is an oxidized asphalt coating, a polymer modified asphalt coating, or any combination thereof.

In some embodiments, the article includes a plurality of granules, wherein the plurality of granules is embedded in the asphalt coating.

In some embodiments, the article is a roofing shingle.

In some embodiments, the glass mat includes interstitial voids, and, in some embodiments, at least some of the interstitial voids are filled by the polymeric binder.

Some embodiments of the present disclosure relate to a method of manufacturing an article comprising a polymer reinforced glass mat. In some embodiments, the method includes obtaining a glass mat comprising a web of glass fibers. In some embodiments, the method further includes embedding a reinforcement material in the form of a polymeric binder into the web of glass fibers, so as to form a polymer reinforced glass mat. In some embodiments, the embedding step embeds the polymeric binder into the web of glass fibers in a sufficient amount so as to result in an article having a nail shank shear resistance of 13 lbs to 17 lbs, when the article is tested according to ASTM 1761 at 140° F.

In some embodiments, the polymeric binder is embedded into the glass mat as a powder.

In some embodiments, the powder has an average particle size ranging from 100 to 600 microns.

In some embodiments, embedding the polymeric binder into the glass mat includes: applying the polymeric binder to the glass mat using an alternating electromagnetic field, electrostatic deposition of the polymeric binder, placing the polymeric binder into physical contact with the glass mat while the glass mat is at a sufficient temperature for the polymeric binder to adhere to the glass mat, applying the polymeric binder to the glass mat using a fluidized air bed, or any combination thereof.

In some embodiments, the method further includes, before embedding the polymeric binder into the glass mat, preheating the glass mat to a temperature ranging from 350° F. to 525° F.

In some embodiments, the method further includes applying an asphalt coating to the polymer reinforced glass mat, so as to form an asphalt coated polymer reinforced glass mat.

In some embodiments, applying the asphalt coating to the polymer reinforced glass mat includes: coating the portion with a slot die, coating the portion with a metering wheel, or any combination thereof.

In some embodiments, the method further includes embedding a plurality of granules within the asphalt coating, so as to form a roofing shingle.

In some embodiments, the glass mat includes interstitial voids; and embedding a polymeric binder into the web of glass fibers, so as to form a polymer reinforced glass mat, includes filling at least some of the interstitial voids with the polymeric binder.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DRAWINGS

Figure 2:
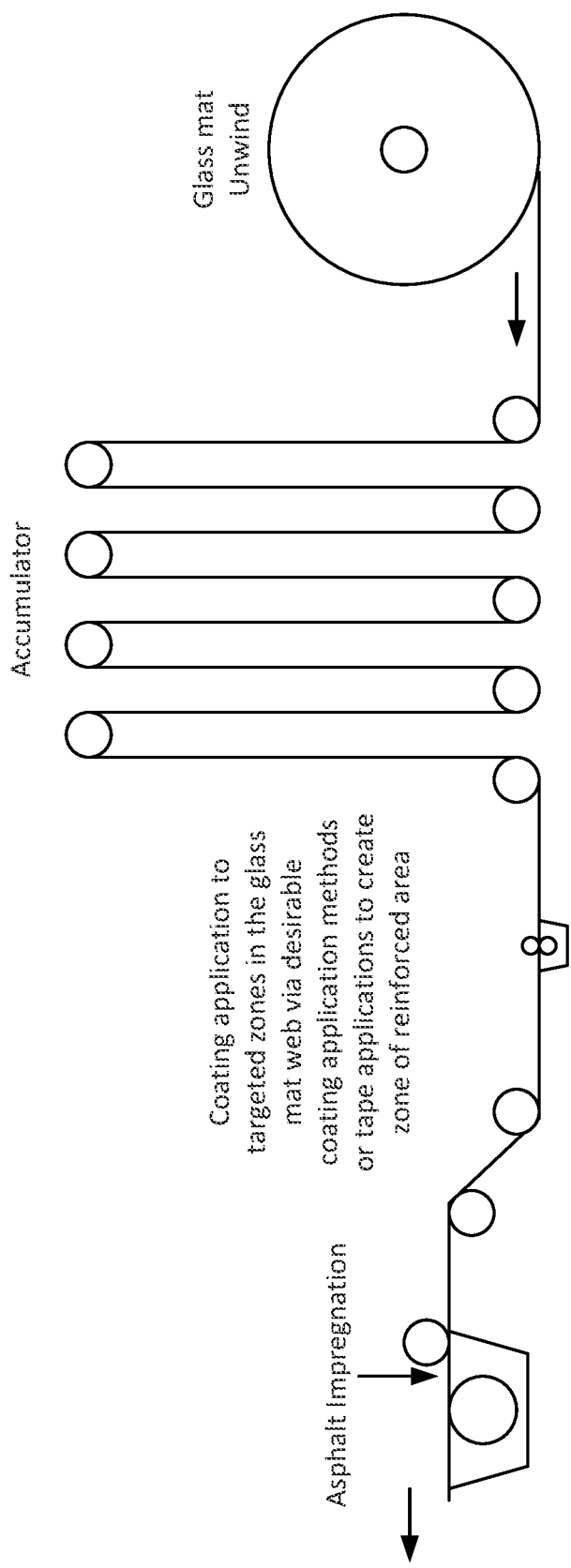

FIGS. 1 and 2 are non-limiting examples of a method of manufacturing an article having a reinforcement material.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

As used herein, a "reinforced glass mat" is a glass mat that includes a reinforcement material.

As used herein, a "reinforcement material" is any material that, when present in a sufficient amount, provides a nail shank shear resistance described herein, under the measurement conditions (e.g., temperature, test method) described herein.

As used herein, a "polymer reinforced glass mat" is a reinforced glass mat where the reinforcement material includes at least one polymer. In some embodiments, the at least one polymer may take the form of a polymeric binder.

As used herein, "oxidized asphalt coating" is defined as a form of processed asphalt that is created by oxidizing asphalt. A non-limiting example of an oxidation procedure is air-blowing, in which air is blown into asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein "nail shank shear resistance" is defined and measured according to ASTM 1761.

As used herein "melt flow index" is defined and measured according to ASTM D1238.

As used herein, vicat softening temperature is defined and measured according to ASTM D1525.

As used herein, "polymer modified asphalt coating" is defined as a form of processed asphalt that is created by adding at least one polymer to asphalt. A non-limiting example of a polymer modification procedure is emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

Some embodiments of the present disclosure relate to an article comprising a polymer reinforced glass mat. In some embodiments, the reinforced glass mat includes a glass mat and a reinforcement material in the form of a polymeric binder. In some embodiments, the glass mat includes a web of glass fibers. In some embodiments, the polymeric binder is embedded into the web of glass fibers of the glass mat.

In some embodiments, the reinforced glass mat includes a sufficient amount of the polymeric binder, so as to result in a nail shank shear resistance of 13 lbs to 17 lbs, when the article is tested according to ASTM 1761 at 140° F. In some embodiments, the reinforced glass mat includes a sufficient amount of the polymeric binder, so as to result in a nail shank shear resistance of 14 lbs to 17 lbs, when the article is tested according to ASTM 1761 at 140° F. In some embodiments, the reinforced glass mat includes a sufficient amount of the polymeric binder, so as to result in a nail shank shear resistance of 15 lbs to 17 lbs, when the article is tested according to ASTM 1761 at 140° F. In some embodiments, the reinforced glass mat includes a sufficient amount of the polymeric binder, so as to result in a nail shank shear resistance of 16 lbs to 17 lbs, when the article is tested according to ASTM 1761 at 140° F.

In some embodiments, the reinforced glass mat includes a sufficient amount of the polymeric binder, so as to result in a nail shank shear resistance of 13 lbs to 16 lbs, when the article is tested according to ASTM 1761 at 140° F. In some embodiments, the reinforced glass mat includes a sufficient amount of the polymeric binder, so as to result in a nail shank shear resistance of 13 lbs to 15 lbs, when the article is tested according to ASTM 1761 at 140° F. In some embodiments, the reinforced glass mat includes a sufficient amount of the polymeric binder, so as to result in a nail shank shear resistance of 13 lbs to 14 lbs, when the article is tested according to ASTM 1761 at 140° F.

In some embodiments, the reinforced glass mat includes a sufficient amount of the polymeric binder, so as to result in a nail shank shear resistance of 14 lbs to 16 lbs, when the article is tested according to ASTM 1761 at 140° F. In some embodiments, the reinforced glass mat includes a sufficient amount of the polymeric binder, so as to result in a nail shank shear resistance of 14 lbs to 15 lbs, when the article is tested according to ASTM 1761 at 140° F. In some embodiments, the reinforced glass mat includes a sufficient amount of the polymeric binder, so as to result in a nail shank shear resistance of 15 lbs to 16 lbs, when the article is tested according to ASTM 1761 at 140° F.

In some embodiments, the sufficient amount of the polymeric binder ranges from 0.5 lbs to 2.5 lbs per square inch of the article. In some embodiments, the sufficient amount of the polymeric binder ranges from 1 lb to 2.5 lbs per square inch of the article. In some embodiments, the sufficient amount of the polymeric binder ranges from 1.5 lbs to 2.5 lbs per square inch of the article. In some embodiments, the sufficient amount of the polymeric binder ranges from 2 lbs to 2.5 lbs per square inch of the article.

In some embodiments, the sufficient amount of the polymeric binder ranges from 0.5 lbs to 2 lbs per square inch of the article. In some embodiments, the sufficient amount of the polymeric binder ranges from 0.5 lbs to 1.5 lbs per square inch of the article. In some embodiments, the sufficient amount of the polymeric binder ranges from 0.5 lbs to 1 lb per square inch of the article.

In some embodiments, the sufficient amount of the polymeric binder ranges from 0.5 lbs to 1.5 lbs per square inch of the article. In some embodiments, the sufficient amount of the polymeric binder ranges from 0.5 lbs to 1 lb per square inch of the article. In some embodiments, the sufficient amount of the polymeric binder ranges from 1 lb to 1.5 lbs per square inch of the article.

In some embodiments, the sufficient amount of the polymeric binder ranges from 0.5 lbs to 2.5 lbs per square of the article. In some embodiments, the sufficient amount of the polymeric binder ranges from 1 lb to 2.5 lbs per square of the article. In some embodiments, the sufficient amount of the polymeric binder ranges from 1.5 lbs to 2.5 lbs per square of the article. In some embodiments, the sufficient amount of the polymeric binder ranges from 2 lbs to 2.5 lbs per square of the article.

In some embodiments, the sufficient amount of the polymeric binder ranges from 0.5 lbs to 2 lbs per square of the article. In some embodiments, the sufficient amount of the polymeric binder ranges from 0.5 lbs to 1.5 lbs per square of the article. In some embodiments, the sufficient amount of the polymeric binder ranges from 0.5 lbs to 1 lb per square of the article.

In some embodiments, the sufficient amount of the polymeric binder ranges from 0.5 lbs to 1.5 lbs per square of the article. In some embodiments, the sufficient amount of the polymeric binder ranges from 0.5 lbs to 1 lb per square of the article. In some embodiments, the sufficient amount of the polymeric binder ranges from 1 lb to 1.5 lbs per square of the article.

In some embodiments, the sufficient amount of the polymeric binder ranges from 0.1% to 1.2% based on a total weight of the article. In some embodiments, the sufficient amount of the polymeric binder ranges from 0.2% to 1.2% based on a total weight of the article. In some embodiments, the sufficient amount of the polymeric binder ranges from 0.5% to 1.2% based on a total weight of the article. In some embodiments, the sufficient amount of the polymeric binder ranges from 1% to 1.2% based on a total weight of the article.

In some embodiments, the sufficient amount of the polymeric binder ranges from 0.1% to 1% based on a total weight of the article. In some embodiments, the sufficient amount of the polymeric binder ranges from 0.1% to 0.5% based on a total weight of the article. In some embodiments, the sufficient amount of the polymeric binder ranges from 0.1% to 0.2% based on a total weight of the article.

In some embodiments, the sufficient amount of the polymeric binder ranges from 0.2% to 1% based on a total weight of the article. In some embodiments, the sufficient amount of the polymeric binder ranges from 0.2% to 0.5% based on a total weight of the article. In some embodiments, the sufficient amount of the polymeric binder ranges from 0.5% to 1% based on a total weight of the article.

In some embodiments, the polymeric binder includes at least one polymer. In some embodiments, the at least one polymer is a thermoplastic. In some embodiments, the at least one polymer is low-density polyethylene (LDPE), medium-density polyethylene (MDPE), high-density polyethylene (HDPE), polypropylene, at least one acrylic, polyvinyl siloxane (PVS), poly(styrene-butadiene-styrene) (SBS), atactic polypropylene (APP), or any combination thereof.

In some embodiments, the at least one polymer of the polymeric binder has a melting temperature of 120° C. to 200° C. In some embodiments, the at least one polymer of the polymeric binder has a melting temperature of 140° C. to 200° C. In some embodiments, the at least one polymer of the polymeric binder has a melting temperature of 160° C. to 200° C. In some embodiments, the at least one polymer of the polymeric binder has a melting temperature of 180° C. to 200° C.

In some embodiments, the at least one polymer of the polymeric binder has a melting temperature of 120° C. to 180° C. In some embodiments, the at least one polymer of the polymeric binder has a melting temperature of 120° C. to 160° C. In some embodiments, the at least one polymer of the polymeric binder has a melting temperature of 120° C. to 140° C.

In some embodiments, the at least one polymer of the polymeric binder has a melting temperature of 140° C. to 180° C. In some embodiments, the at least one polymer of the polymeric binder has a melting temperature of 140° C. to 160° C. In some embodiments, the at least one polymer of the polymeric binder has a melting temperature of 160° C. to 180° C.

In some embodiments, the at least one polymer of the polymeric binder has a melt flow index of 20 to 100 measured according to ASTM D1238. In some embodiments, the at least one polymer of the polymeric binder has a melt flow index of 40 to 100 measured according to ASTM D1238. In some embodiments, the at least one polymer of the polymeric binder has a melt flow index of 60 to 100 measured according to ASTM D1238. In some embodiments, the at least one polymer of the polymeric binder has a melt flow index of 80 to 100 measured according to ASTM D1238.

In some embodiments, the at least one polymer of the polymeric binder has a melt flow index of 20 to 80 measured according to ASTM D1238. In some embodiments, the at least one polymer of the polymeric binder has a melt flow index of 20 to 60 measured according to ASTM D1238. In some embodiments, the at least one polymer of the polymeric binder has a melt flow index of 20 to 40 measured according to ASTM D1238.

In some embodiments, the at least one polymer of the polymeric binder has a melt flow index of 40 to 80 measured according to ASTM D1238. In some embodiments, the at least one polymer of the polymeric binder has a melt flow index of 40 to 60 measured according to ASTM D1238. In some embodiments, the at least one polymer of the polymeric binder has a melt flow index of 60 to 80 measured according to ASTM D1238.

In some embodiments, the at least one polymer of the polymeric binder has a vicat softening temperature of 50° C. to 90° C. measured according to ASTM D1525. In some embodiments, the at least one polymer of the polymeric binder has a vicat softening temperature of 60° C. to 90° C. measured according to ASTM D1525. In some embodiments, the at least one polymer of the polymeric binder has a vicat softening temperature of 70° C. to 90° C. measured according to ASTM D1525. In some embodiments, the at least one polymer of the polymeric binder has a vicat softening temperature of 80° C. to 90° C. measured according to ASTM D1525.

In some embodiments, the at least one polymer of the polymeric binder has a vicat softening temperature of 50° C. to 80° C. measured according to ASTM D1525. In some embodiments, the at least one polymer of the polymeric binder has a vicat softening temperature of 50° C. to 70° C. measured according to ASTM D1525. In some embodiments, the at least one polymer of the polymeric binder has a vicat softening temperature of 50° C. to 60° C. measured according to ASTM D1525.

In some embodiments, the at least one polymer of the polymeric binder has a vicat softening temperature of 60° C. to 70° C. measured according to ASTM D1525. In some embodiments, the at least one polymer of the polymeric binder has a vicat softening temperature of 70° C. to 80° C. measured according to ASTM D1525.

In some embodiments, the article comprising the polymer reinforced glass mat is a roofing shingle. In some embodiments, the roofing shingle includes an asphalt coating surrounding the polymer reinforced glass mat. In some embodiments, a plurality of granules is embedded in the asphalt coating.

In some embodiments, the article has a uniform thickness. In some embodiments, the article has a non-uniform thickness. In some embodiments, the article is a roofing shingle. In some embodiments, the roofing shingle includes a headlap portion, a buttlap portion, a dragontooth portion and a nail zone.

In some embodiments, the reinforcement material is present in the article as at least one reinforcement region. In some embodiments, the at least one reinforcement region is present on a headlap portion, a buttlap portion, a dragontooth portion, a nail zone, or any combination thereof.

In some embodiments, the at least one reinforcement region has a width of 0.5 inches to 8 inches. In some embodiments the at least one reinforcement region has a width of 1 inch to 8 inches. In some embodiments the at least one reinforcement region has a width of 2 inches to 8 inches. In some embodiments the at least one reinforcement region has a width of 3 inches to 8 inches. In some embodiments the at least one reinforcement region has a width of 4 inches to 8 inches. In some embodiments the at least one reinforcement region has a width of 5 inches to 8 inches. In some embodiments the at least one reinforcement region has a width of 6 inches to 8 inches. In some embodiments the at least one reinforcement region has a width of 7 inches to 8 inches.

In some embodiments the at least one reinforcement region has a width of 0.5 inches to 7 inches. In some embodiments the at least one reinforcement region has a width of 0.5 inches to 6 inches. In some embodiments the at least one reinforcement region has a width of 0.5 inches to 5 inches. In some embodiments the at least one reinforcement region has a width of 0.5 inches to 4 inches. In some embodiments the at least one reinforcement region has a width of 0.5 inches to 3 inches. In some embodiments the at least one reinforcement region has a width of 0.5 inches to 2 inches. In some embodiments the at least one reinforcement region has a width of 0.5 inches to 1 inch.

In some embodiments the at least one reinforcement region has a width of 1 inches to 7 inches. In some embodiments the at least one reinforcement region has a width of 2 inches to 6 inches. In some embodiments the at least one reinforcement region has a width of 3 inches to 5 inches.

In some embodiments, there are 1 to 4 reinforcement regions in the article. In some embodiments, there are 2 to 4 reinforcement regions in the article. In some embodiments, there are 3 to 4 reinforcement regions in the article.

In some embodiments, there are 1 to 3 reinforcement regions in the article. In some embodiments, there are 1 to 2 reinforcement regions in the article.

In some embodiments, there are 2 to 3 reinforcement regions in the article.

In some embodiments, the article is a roofing shingle that includes a plurality of granules embedded in an asphalt coating. In some embodiments, the asphalt coating, the plurality of granules, or any combination thereof, is present on the headlap portion, the buttlap portion, the dragontooth portion, the nail zone, or any combination thereof. In some embodiments, the plurality of granules, the asphalt coating, or combination thereof is present on an entirety of the roofing shingle.

In some embodiments, the asphalt coating is an oxidized asphalt coating, a polymer modified asphalt coating, or any combination thereof.

In some embodiments where the polymer modified asphalt coating is present, the polymer modified asphalt coating includes at least one polymer in an amount ranging from 1% to 20% by weight of the polymer modified asphalt coating. In some embodiments, the polymer modified asphalt coating includes at least one polymer in an amount ranging from 2% to 20% by weight of the polymer modified asphalt coating. In some embodiments, the polymer modified asphalt coating includes at least one polymer in an amount ranging from 5% to 20% by weight of the polymer modified asphalt coating. In some embodiments, the polymer modified asphalt coating includes at least one polymer in an amount ranging from 10% to 20% by weight of the polymer modified asphalt coating. In some embodiments, the polymer modified asphalt coating includes at least one polymer in an amount ranging from 15% to 20% by weight of the polymer modified asphalt coating. In some embodiments, the polymer modified asphalt coating includes at least one polymer in an amount ranging from 19% to 20% by weight of the polymer modified asphalt coating.

In some embodiments, the polymer modified asphalt coating includes at least one polymer in an amount ranging from 1% to 19% by weight of the polymer modified asphalt coating. In some embodiments, the polymer modified asphalt coating includes at least one polymer in an amount ranging from 1% to 15% by weight of the polymer modified asphalt coating. In some embodiments, the polymer modified asphalt coating includes at least one polymer in an amount ranging from 1% to 10% by weight of the polymer modified asphalt coating. In some embodiments, the polymer modified asphalt coating includes at least one polymer in an amount ranging from 1% to 5% by weight of the polymer modified asphalt coating. In some embodiments, the polymer modified asphalt coating includes at least one polymer in an amount ranging from 1% to 2% by weight of the polymer modified asphalt coating In some embodiments, the polymer modified asphalt coating includes at least one polymer in an amount ranging from 2% to 19% by weight of the polymer modified asphalt coating. In some embodiments, the polymer modified asphalt coating includes at least one polymer in an amount ranging from 5% to 15% by weight of the polymer modified asphalt coating. In some embodiments, the polymer modified asphalt coating includes at least one polymer in an amount ranging from 5% to 10% by weight of the polymer modified asphalt coating. In some embodiments, the polymer modified asphalt coating includes at least one polymer in an amount ranging from 10% to 15% by weight of the polymer modified asphalt coating.

In some embodiments, the article of the present disclosure is a shingle and the reinforcement material is present in the nail zone of the shingle. In some embodiments, the reinforcement material is present in at least one portion of the shingle other than the nail zone, such as but not limited to, the headlap portion, the buttlap portion, the dragontooth portion, the nail zone, or any combination thereof. In some embodiments where the article is a shingle including a headlap portion, the reinforcement material may not be present on the headlap portion.

In some embodiments, the reinforcement material includes a tape. In some embodiments, the tape is a polyester tape with a pressure sensitive adhesive backing, nylon tape with adhesives, fiber reinforced tape with adhesives, a scrim tape with an adhesive, or any combination thereof.

In some embodiments, the reinforcement material does not include a tape. In some embodiments, the reinforcement material may include a scrim. In some embodiments, the reinforcement material may take the form of a coating layer that is at least partially embedded in the web of the glass mat. For example, in some embodiments, the glass mat can include a plurality of interstitial voids and the reinforcement material can fill at least some of the interstitial voids. In some embodiments, the coating layer may further include a supplemental coating, such as but not limited to, a hot melt adhesive, a thermoplastic resin, a thermoset resin, or any combination thereof. In some embodiments, the coating layer comprising the reinforcement material may be applied via roll coating, transfer coating, spray coating, curtain coating, flame coating, thermal spray coating, multi-component coating or two-part sprayer coating, pultrusion coating, or any combination thereof.

Some embodiments of the present disclosure relate to a method of manufacturing an article comprising the polymer reinforced glass mat. In some embodiments, the method includes obtaining a glass mat comprising a web of glass fibers. In some embodiments, the method further includes embedding a reinforcement material in the form of a polymer binder into the web of glass fibers, so as to form a reinforced glass mat. In some embodiments, the embedding step embeds the reinforcement material into the web of glass fibers in a sufficient amount so as to result in an article having a nail shank shear resistance described herein when tested according to ASTM 1761 at 140° F.

In some embodiments, the embedding is performed using a slot die. In some embodiments, the slot die can include a 2-inch wide zone. In some embodiments, the embedding is performed using a metering wheel. In some embodiments, after embedding the reinforcement material into the web of glass fibers, the method includes scraping excess reinforcement material from the reinforced glass mat, so as to form an article having a uniform thickness.

In some embodiments, before embedding the reinforcement material into the glass mat, the method includes preheating the glass mat to a temperature ranging from 350° F. to 525° F. In some embodiments, before embedding the reinforcement material into the glass mat, the method includes preheating the glass mat to a temperature ranging from 400° F. to 525° F. In some embodiments, before embedding the reinforcement material into the glass mat, the method includes preheating the glass mat to a temperature ranging from 450° F. to 525° F. In some embodiments, before embedding the reinforcement material into the glass mat, the method includes preheating the glass mat to a temperature ranging from 500° F. to 525° F.

In some embodiments, before embedding the reinforcement material into the glass mat, the method includes preheating the glass mat to a temperature ranging from 350° F. to 500° F. In some embodiments, before embedding the reinforcement material into the glass mat, the method includes preheating the glass mat to a temperature ranging from 350° F. to 450° F. In some embodiments, before embedding the reinforcement material into the glass mat, the method includes preheating the glass mat to a temperature ranging from 350° F. to 400° F.

In some embodiments, before embedding the reinforcement material into the glass mat, the method includes preheating the glass mat to a temperature ranging from 400° F. to 500° F. In some embodiments, before embedding the reinforcement material into the glass mat, the method includes preheating the glass mat to a temperature ranging from 400° F. to 450° F. In some embodiments, before embedding the reinforcement material into the glass mat, the method includes preheating the glass mat to a temperature ranging from 450° F. to 500° F.

In some embodiments, the article comprising the reinforced glass mat is formed into a roofing shingle. In some embodiments the roofing shingle is formed by applying an asphalt coating to the reinforced glass mat and embedding a plurality of granules within the reinforcement material, the asphalt coating, or any combination thereof. In some embodiments, the method further includes scraping excess reinforcement material, excess asphalt coating, excess granules, or any combination thereof, so as to form a roofing shingle having a uniform thickness.

In some embodiments, the polymeric binder is embedded into the glass mat as a powder. In some embodiments, the powder has an average particle size ranging from 100 to 600 microns. In some embodiments, the powder has an average particle size ranging from 200 to 600 microns. In some embodiments, the powder has an average particle size ranging from 300 to 600 microns. In some embodiments, the powder has an average particle size ranging from 400 to 600 microns. In some embodiments, the powder has an average particle size ranging from 500 to 600 microns.

In some embodiments, the powder has an average particle size ranging from 100 to 500 microns. In some embodiments, the powder has an average particle size ranging from 100 to 400 microns. In some embodiments, the powder has an average particle size ranging from 100 to 300 microns. In some embodiments, the powder has an average particle size ranging from 100 to 200 microns.

In some embodiments, the powder has an average particle size ranging from 200 to 500 microns. In some embodiments, the powder has an average particle size ranging from 300 to 400 microns.

In some embodiments, embedding the polymeric binder into the glass mat includes: applying the polymeric binder to the glass mat using an alternating electromagnetic field, electrostatic deposition of the polymeric binder, placing the polymeric binder into physical contact with the glass mat while the glass mat is at a sufficient temperature for the polymeric binder to adhere to the glass mat, applying the polymeric binder to the glass mat using a fluidized air bed, or any combination thereof.

In some embodiments, the method further includes applying an asphalt coating to the polymer reinforced glass mat, so as to form an asphalt coated polymer reinforced glass mat.

In some embodiments, applying the asphalt coating to the polymer reinforced glass mat includes coating a portion of the polymer reinforced glass mat with a first asphalt coating. In some embodiments, applying the asphalt coating to the polymer reinforced glass mat further includes coating a portion of the polymer reinforced glass mat with a second asphalt coating. In some embodiments, the first asphalt coating and the second asphalt coating are the same. In some embodiments, the first asphalt coating and the second asphalt coating are different. In some embodiments, applying the asphalt coating to the polymer reinforced glass mat includes coating the web of fibers of the polymer reinforced glass mat with an oxidized asphalt coating.

In some embodiments, the method further includes embedding a plurality of granules within the asphalt coating, so as to form a shingle, such as but not limited to, a roofing shingle.

A non-limiting example of a method of manufacturing an article having a reinforcement material according to the present disclosure, is shown in FIGS. 1 and 2.

As shown in FIG. 1, the non-limiting exemplary method may include using a slot die comprising pumps (P) to inject a reinforcement material (such as but not limited to a polymeric binder), thereby embedding the reinforcement material into empty spaces (interstitial voids) on a web of the glass mat. As shown, in some embodiments, the embedding of the reinforcement material may create a strengthened cross section. The pumps (P) of the slot dies may, in some embodiments, be electronically geared to the line speed to provide a sufficient amount of the reinforcement material (as described herein) to fill the glass mat thereby forming a nail zone before reaching an asphalt coating area of the production line.

As shown in FIG. 2, in some non-limiting embodiments, the reinforcement material may be applied as a coating layer, during a shingle manufacturing process, so as to form at least one reinforcement region. As shown, the coating layer may, in some embodiments, be applied in the manufacturing process, before application (e.g., impregnation) of an asphalt coating. As shown, the coating layer may, in some embodiments, be applied in the manufacturing process, after unwinding the glass mat and after accumulating the glass mat.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

EXAMPLES

Comparative Example 1

A comparative sample was prepared by embedding a non-woven glass mat having a 1.73 lb/CFS base weight (Available from GAF, Ennis, TX) with molten asphalt filled by 65 wt % calcium carbonate fillers using a roller mill. The asphalt coating was prepared by heating up asphalt to 375-400° F. into a liquid form, and the calcium carbonate fillers were introduced into the asphalt with agitations to ensure a uniform mixture. The resultant shingle sample had a thickness of 60 mil.

The resultant shingle sample was tested according to ASTM 1761 by replacing the prism wood piece (see, sections 13-20 of ASTM 1761) with the shingle sample. The following test conditions, set forth in Table 1, were also used.

TABLE 1

| Nail Type | Standard Roofing Nail: #11 gauge, 1¼ inch length |
|---|---|
| Test Speed as per ASTM 1761 | 0.25 inches per minute |
| Sample shingle dimensions | 2 inches × 5 inches |

Results of the ASTM 1761 test are shown in Table 2 below.

Comparative Example 2

Another set of samples were prepared in the same manner as in Comparative Example 1, except that the same glass mat used was first heated by using an IR lamp to a temperature in the range of 200-250° F. prior to the application of the filled asphalt coating. The resultant samples were tested using ASTM 1761 and the same test conditions as Comparative Example 1. The data shown in Table 2 revealed that no improvement was found when tested at 140° F.

Example 1

Yet another set of samples were prepared in the same manner as in Comparative Example 1, except that the glass mat was first reinforced by adding polymeric powders prior to the impregnation of molten asphalt. This was achieved by adding 10 g of polyolefin powder with a melt flow index of 70 as per ASTM D1238 and a melting point of 213.4° F. (Microthene MN71400, available from Lyondellbasell) to evenly spread over the sample area of and heat the samples to around 160° F. for about a minute to cause the powder to stick to the glass mat. The mat was then coated with molten, filled asphalt as in the case of Comparative Example 1. The resultant samples were then tested for nail shank shear resistance using ASTM 1761 and the same test conditions as Comparative Examples 1 and 2. Results are shown in Table 2. As can be seen, there is an increase in nail shank shear at 140° F. This suggests that adding a polymeric binder added to the glass mat in the form of a polymeric powder may be an effective way to enhance nail shank shear resistance.

TABLE 2

Results of ASTM 1761 Test

|  | Comparative Example 1 | Comparative Example 2 | Example 1 |
|---|---|---|---|
| Test Temperature | 140° F. | 140° F. | 140° F. |
| Averaged Nail Shank Shear Resistance, lb | 8.4 | 8.0 | 14.3 |
| Standard Deviation | 1.7 | 0.9 | 1.7 |

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. An article, comprising:
 a polymer reinforced glass mat,
  wherein the polymer reinforced glass mat comprises:
   a glass mat,
    wherein the glass mat comprises a web of glass fibers; and
    wherein the glass mat comprises interstitial voids; and
   a polymeric binder,
    wherein the polymeric binder is embedded into the web of glass fibers;
    wherein the polymeric binder consists essentially of low-density polyethylene (LDPE), medium-density polyethylene (MDPE), high-density polyethylene (HDPE), polypropylene, polyvinyl siloxane (PVS), poly(styrene-butadiene-styrene) (SBS), or any combination thereof.

2. The article of claim 1, further comprising an asphalt coating, wherein the asphalt coating surrounds the polymer reinforced glass mat.

3. The article of claim 2, further comprising a plurality of granules, wherein the plurality of granules is embedded in the asphalt coating.

4. The article of claim 3, wherein the article is a roofing shingle.

5. The article of claim 1, wherein the polymeric binder comprises at least one polymer having a melting temperature of 120° C. to 200° C.

6. The article of claim 1, wherein the polymeric binder comprises at least one polymer having a melt flow index of 20 to 60 measured according to ASTM D1238.

7. The article of claim 1, wherein the polymeric binder comprises at least one polymer having a vicat softening temperature of 50° C. to 90° C. measured according to ASTM D1525.

8. The article of claim 2, wherein the asphalt coating is an oxidized asphalt coating, a polymer modified asphalt coating, or any combination thereof.

9. The article of claim 8, further comprising a plurality of granules, wherein the plurality of granules is embedded in the asphalt coating.

10. The article of claim 9, wherein the article is a roofing shingle.

11. The article of claim 1, wherein the polymeric binder comprises atactic polypropylene (APP).

12. The article of claim 1, further comprising an asphalt coating, wherein the asphalt coating coats the polymer reinforced glass mat.

13. The article of claim 12, further comprising a plurality of granules, wherein the plurality of granules is embedded in the asphalt coating.

14. A roofing material, comprising:
 a polymer reinforced glass mat,
  wherein the polymer reinforced glass mat comprises:
   a glass mat,
    wherein the glass mat comprises a web of glass fibers; and
    wherein the glass mat comprises interstitial voids; and
   a polymeric binder,
    wherein the polymeric binder is embedded into the web of glass fibers;
    wherein the polymeric binder consists essentially of low-density polyethylene (LDPE), medium-density polyethylene (MDPE), high-density polyethylene (HDPE), polypropylene, polyvinyl siloxane (PVS), poly(styrene-butadiene-styrene) (SBS), or any combination thereof; and
 an asphalt coating,
  wherein the asphalt coating coats the polymer reinforced glass mat.

15. The roofing material of claim 14, further comprising a plurality of granules,
 wherein the plurality of granules is embedded in the asphalt coating.

16. The roofing material of claim 15, wherein the asphalt coating comprises an oxidized asphalt coating, a polymer modified asphalt coating, or any combination thereof.

17. The roofing material of claim 14, wherein the asphalt coating comprises an oxidized asphalt coating, a polymer modified asphalt coating, or any combination thereof.

18. The roofing material of claim 14, wherein the polymeric binder comprises at least one polymer having a melting temperature of 120° C. to 200° C.

19. The roofing material of claim 14, wherein the polymeric binder comprises at least one polymer having a melt flow index of 20 to 60 measured according to ASTM D1238.

* * * * *